US008468539B2

(12) United States Patent
Eichenberger et al.

(10) Patent No.: US 8,468,539 B2
(45) Date of Patent: Jun. 18, 2013

(54) TRACKING AND DETECTING THREAD DEPENDENCIES USING SPECULATIVE VERSIONING CACHE

(75) Inventors: Alexandre E. Eichenberger, Chappaqua, NY (US); John K. P. O'Brien, South Salem, NY (US); Kathryn M. O'Brien, South Salem, NY (US); Lakshminarayanan Renganarayana, Elmsford, NY (US); Xiaotong Zhuang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 958 days.

(21) Appl. No.: 12/553,314

(22) Filed: Sep. 3, 2009

(65) Prior Publication Data
US 2011/0055484 A1 Mar. 3, 2011

(51) Int. Cl.
*G06F 9/46* (2006.01)
(52) U.S. Cl.
USPC ........................................................ 718/106
(58) Field of Classification Search
None
See application file for complete search history.

(56) References Cited

U.S. PATENT DOCUMENTS

| 6,950,927 | B1 * | 9/2005 | Apisdorf et al. ............ 712/216 |
|---|---|---|---|
| 2003/0018684 | A1 * | 1/2003 | Ohsawa et al. .............. 709/102 |
| 2004/0054990 | A1 | 3/2004 | Liao et al. |
| 2004/0128448 | A1 | 7/2004 | Stark et al. |
| 2005/0071841 | A1 | 3/2005 | Hoflehner et al. |
| 2006/0047495 | A1 | 3/2006 | Sanchez et al. |
| 2007/0174555 | A1 | 7/2007 | Burtscher et al. |
| 2008/0263280 | A1 | 10/2008 | Gara et al. |
| 2009/0083488 | A1 * | 3/2009 | Madriles Gimeno et al. 711/118 |
| 2010/0031268 | A1 * | 2/2010 | Dwyer et al. ................ 718/106 |

OTHER PUBLICATIONS

Hammond et al., The Stanford Hydra CMP, IEEE Micro, Mar. 2000.*
Rundberg, Reordered Speculative Execution of Critical Sections, Proceedings of the 2002 International Conference on Parallel Processing (2002).*
Steffan et al., A Scalable Approach to Thread-Level Speculation, Proceedings of the 27th Annual International Symposium on Computer Architecture (ISCA '00), May 2000.*
Sohi et al., Speculative Multithreaded Processors, Computer, Apr. 2001.*

(Continued)

*Primary Examiner* — Jennifer To
*Assistant Examiner* — Benjamin Wu
(74) *Attorney, Agent, or Firm* — Stephen J. Walder, Jr.; William Stock

(57) ABSTRACT

Mechanisms are provided for tracking dependencies of threads in a multi-threaded computer program execution. The mechanisms detect a dependency of a first thread's execution on results of a second thread's execution in an execution flow of the multi-threaded computer program. The mechanisms further store, in a hardware thread dependency vector storage associated with the first thread's execution, an identifier of the dependency by setting at least one bit in the hardware thread dependency vector storage corresponding to the second thread. Moreover, the mechanisms schedule tasks performed by the multi-threaded computer program based on the hardware thread dependency vector storage to minimize squashing of threads.

19 Claims, 9 Drawing Sheets

OTHER PUBLICATIONS

Rundberg et al., Speculative Lock Reordering: Optimistic Out-of-Order Execution of Critical Sections, Proceedings of the 17th International Symposium on Parallel and Distributed Processing, 2003.*

Bhowmik, Anasua et al., "A General Compiler Framework for Speculative Multithreaded Processors", IEEE Transactions on Parallel and Distributed Systems, vol. 15, No. 8, Aug. 2004, pp. 713-724.

Eichenberger, Alexandre E. et al., "Runtime Dependence-Aware Scheduling Using Assist Thread", U.S. Appl. No. 12/435,809, filed May 5, 2009.

Gopal, Sridhar et al., "Speculative Versioning Cache", Proceedings of the 4th International Symposium on High-Performance Computer Architecture, Jan. 31 to Feb. 4, 1998, pp. 1-11.

* cited by examiner

```
ic = next[i]; //ic=i
ncfaces = Geom.nfpc[ic]; //=3 for (icface=1;icface<=ncfaces;icface++) {
    afpm[icface] = omega[1]*Geom.A_surf[1][icface][1][ic] + omega[2]*Geom.A_surf[2][icface][1][ic] +
                        omega[3]*Geom.A_surf[3][icface][1][ic];
    aezm[icface] = omega[1]*Geom.A_surf[1][icface][2][ic] + omega[2]*Geom.A_surf[2][icface][2][ic] +
                        omega[3]*Geom.A_surf[3][icface][2][ic];
406  if ( afpm[icface] < 0.0 ){
        ...=psifp[1..NPART][icface][ic];   402
    }
408  if (aezm[icface] < 0.0 ) {
        ...=curez[1..NPART][icface][ic];   404
    }else{
        ifp = icface;
        for( k=1; k<=ncfaces-2; k++){
            ifp = ifp%ncfaces + 1;
            if ( afpm[ifp] < 0.0 ) {
                ...=psifp[1...NPART][ifp][ic];|
            }
        }
414   curez[1..NPART][Geom.Connect[4][icface][ic]][Geom.Connect[3][icface][ic]] =...
    }
    if (afpm[icface] > 0.0 && Geom.Connect[1][icface][ic]!=0)
412       psifp[1..NPART][Geom.Connect[2][icface][ic]][Geom.Connect[1][icface][ic]] =...
}
```

FIG. 4

TRACKING AND DETECTING THREAD DEPENDENCIES USING SPECULATIVE VERSIONING CACHE

BACKGROUND

The present application relates generally to an improved data processing apparatus and method and more specifically to an apparatus and method for detecting task complete dependencies using underlying speculative multi-threading hardware.

Typically, loops within executable code of an application take most of the execution time of the application. Therefore, in order to improve performance of applications, parallelization of loops is very important. Current parallelizing compiler infrastructures analyze code at compilation time to identify loops that are amenable to parallelization. Thus, all iterations within the code should be independent, i.e. any two iterations do not access the same data, and one or more of the accesses is a write. Once the independent iterations are determined, the compiler then outlines the loop body as a function. At runtime, symmetric multiprocessing (SMP) runtime controls how iterations are distributed to multiple threads that are running simultaneously, such that the execution of the loop is parallelized.

A major difficulty for loop parallelization is the uncertainty of memory accesses across iterations, which are often impossible to determine at compilation time. Several obstacles may prevent the compiler from properly deriving the dependencies, such as pointer accesses that may not be determined statically, uncertain control flow that may bypass some memory accesses, array elements indexed by complicated computations, or array elements indexed by other arrays (indirect array accesses).

Thread Level Speculation (TLS) may be used to deal with unknown dependencies. Using hardware to detect conflicting memory accesses across iterations relieves the compiler from analyzing the dependencies. However, once a conflict is detected, the loop must be rolled back in order to allow the earlier thread to finish. Rollback, or "squashing" of the thread, is typically expensive, especially for loops with a significant number of conflicting memory accesses.

With speculative multi-threading (SMT), tasks can be speculatively executed even in the presence of data dependencies. The dedicated hardware keeps track of speculative thread read and write data locations and aborts, i.e. rolls back or squashes, threads that are shown to have violated an actual data dependency. While this approach has been shown to work fairly well in program code where a compiler could not prove data independence between tasks, it generally performs sub-optimally in code where there are some or many dependencies between the tasks. This is because, in the presence of dependencies, speculative tasks start to be aborted in significant numbers, thus exhibiting little parallelism advantages while experiencing many of the speculative parallelism disadvantages, e.g., increased memory footprint pressure at version cache level, wasted compute cycles, wasted resources, wasted energy, and the like.

SUMMARY

In one illustrative embodiment, a method, in a data processing system, is provided for tracking dependencies of threads in a multi-threaded computer program execution. The method comprises detecting, by a processor of the data processing system, a dependency of a first thread's execution on results of a second thread's execution in an execution flow of the multi-threaded computer program. The method further comprises storing, by the processor, in a hardware thread dependency vector storage associated with the first thread's execution, an identifier of the dependency by setting at least one bit in the hardware thread dependency vector storage corresponding to the second thread. Moreover, the method comprises scheduling, by the processor, tasks performed by the multi-threaded computer program based on the hardware thread dependency vector storage to minimize squashing of threads.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 depicts an example of code in a loop body in accordance with an illustrative embodiment;

DETAILED DESCRIPTION

Figure 1:
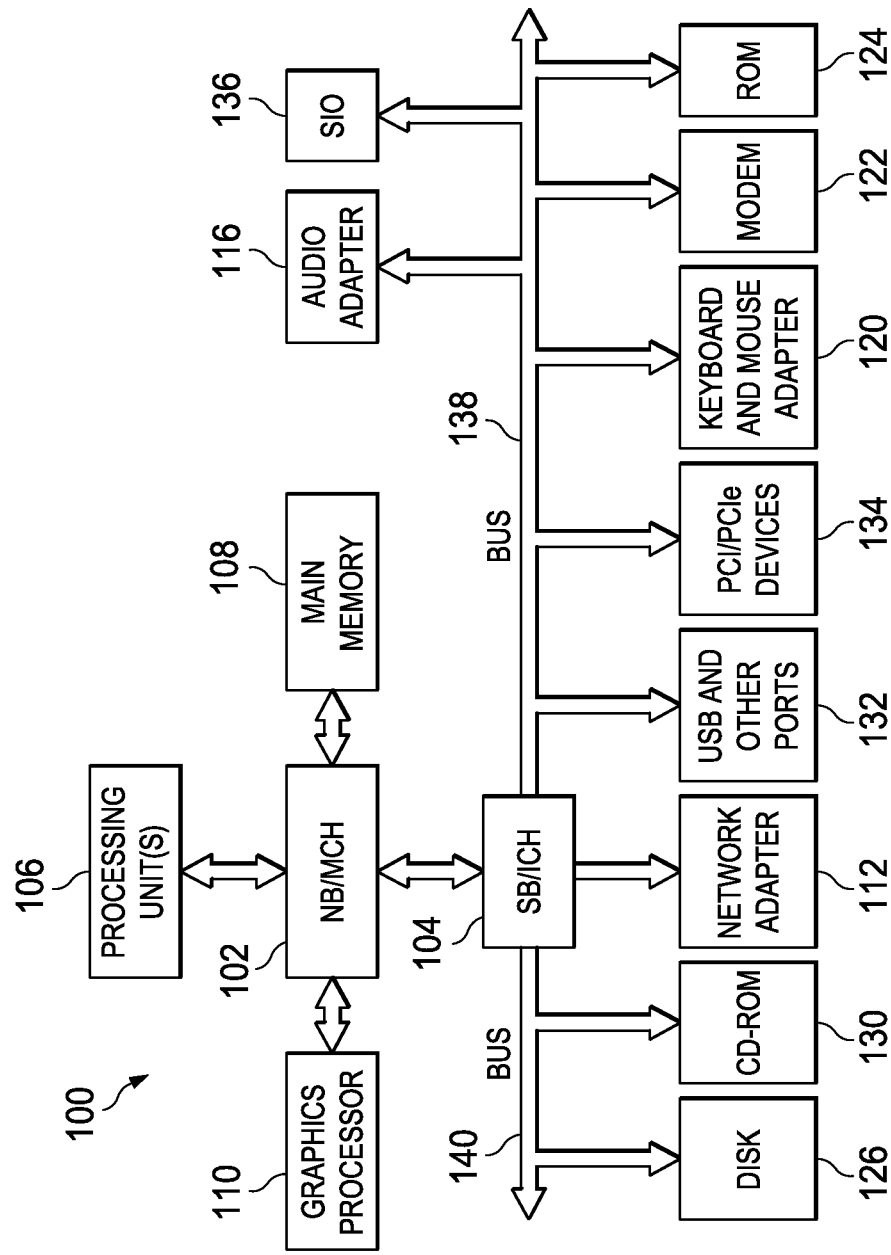
FIG. 1 depicts an exemplary diagram of a data processing environment in which embodiments of the present invention may be implemented.

There is a class of applications, i.e. applications using code loops, where the same computation is performed repetitively though with slowly changing data dependencies among tasks. In such applications, one viable approach is to compute, in software, the data dependence between tasks first and then use this dependence graph to schedule the speculative tasks in such a way that they abort less or do not abort at all depending on whether the dependence graph can be precisely computed. While this approach works well, it is expensive to implement. The compiler must first be able to generate a program slice that detects which memory will be touched by the computations and then the runtime engine must call these slices and build a dependence graph.

To the contrary, the illustrative embodiments provide mechanisms for detecting task complete dependencies using underlying speculative multi-threading hardware. With the mechanisms of the illustrative embodiments, computations are run using speculative multi-threading (SMT) whereby tasks are speculatively performed, squashed, and restarting tasks when violations are discovered. In addition, the illustrative embodiments track and record dependencies in a speculative task dependence graph (STDG).

On subsequent passes, the STDG is used to schedule tasks. The tasks are still performed using SMT because it provides for renaming that eliminates input/output dependencies and it tolerates changed or inaccurate dependence graphs. Subsequent passes may recompute the STDG dynamically for future uses. Thus, in any pass, the STDG for a previous iteration is used while a new STDG for the next iteration is computed. The mechanisms of the illustrative embodiments utilize the underlying existing SMT hardware to keep track of the dependencies with no additional per-cache-line state and minimal additional per-thread state.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In addition, the program code may be embodied on a computer readable storage medium on the server or the remote computer and downloaded over a network to a computer readable storage medium of the remote computer or the users' computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
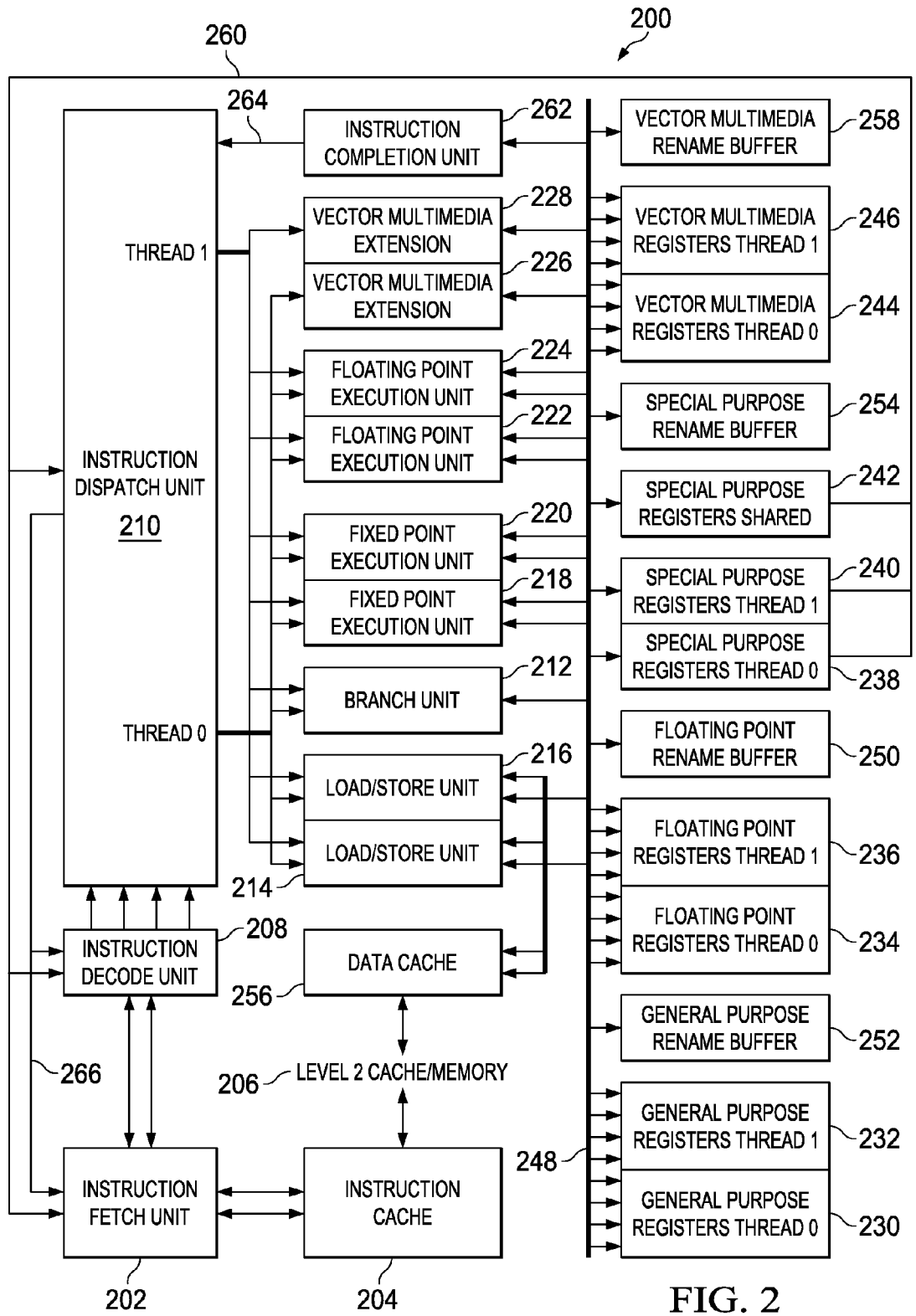
FIG. 2 depicts an exemplary block diagram of a conventional dual threaded processor design showing functional units and registers in which aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a runtime dependence-aware scheduling mechanism that schedules and executes independent iterations ahead of time in parallel with other iterations, this is only an example and is not intended to state or imply any limitation with regard to the features of the present invention. To the contrary, the illustrative embodiments are intended to include distributed data processing environments and embodiments in which independent iterations are scheduled at runtime and executed ahead of time in parallel with other iterations.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts an exemplary diagram of a data processing environment in which embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environments may be made without departing from the spirit and scope of the present invention.

With reference now to FIG. 1, a block diagram of a data processing system is shown in which illustrative embodiments may be implemented. Data processing system 100 is an example of a computer in which computer usable code or instructions implementing the processes may be located for the illustrative embodiments.

In the depicted example, data processing system 100 employs a hub architecture including a north bridge and memory controller hub (MCH) 102 and a south bridge and input/output (I/O) controller hub (ICH) 104. Processing unit 106, main memory 108, and graphics processor 110 are coupled to north bridge and memory controller hub 102. Processing unit 106 may contain one or more processors and even may be implemented using one or more heterogeneous processor systems. Graphics processor 110 may be coupled to the MCH through an accelerated graphics port (AGP), for example.

In the depicted example, local area network (LAN) adapter 112 is coupled to south bridge and I/O controller hub 104 and audio adapter 116, keyboard and mouse adapter 120, modem 122, read only memory (ROM) 124, universal serial bus (USB) ports and other communications ports 132, and PCI/PCIe devices 134 are coupled to south bridge and I/O controller hub 104 through bus 138, and hard disk drive (HDD) 126 and CD-ROM drive 130 are coupled to south bridge and I/O controller hub 104 through bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be coupled to south bridge and I/O controller hub 104.

An operating system runs on processing unit 106 and coordinates and provides control of various components within data processing system 100 in FIG. 1. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 100. Java and all Java-based trademarks are trademarks of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processing unit 106. The processes of the illustrative embodiments may be performed by processing unit 106 using computer implemented instructions, which may be located in a memory such as, for example, main memory 108, read only memory 124, or in one or more peripheral devices.

The hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system.

In some illustrative examples, data processing system 100 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted examples in FIG. 1 and above-described examples are not meant to imply architectural limitations. For example, data processing system 100 also may be a tablet computer, laptop computer, or telephone device in addition to taking the form of a PDA.

Referring to FIG. 2, an exemplary block diagram of a conventional dual threaded processor design showing functional units and registers is depicted in which aspects of the illustrative embodiments may be implemented. Processor 200 may be implemented as processing unit 106 in FIG. 1 in these illustrative examples. Processor 200 comprises a single integrated circuit superscalar microprocessor with dual-thread simultaneous multi-threading (SMT). Accordingly, as discussed further herein below, processor 200 includes various units, registers, buffers, memories, and other sections, all of which are formed by integrated circuitry. Also, in an illustrative embodiment, processor 200 operates according to reduced instruction set computer (RISC) techniques.

As shown in FIG. 2, instruction fetch unit (IFU) 202 connects to instruction cache 204. Instruction cache 204 holds instructions for multiple programs (threads) to be executed. Instruction cache 204 also has an interface to level 2 (L2) cache/memory 206. IFU 202 requests instructions from instruction cache 204 according to an instruction address, and passes instructions to instruction decode unit 208. In an illustrative embodiment, IFU 202 may request multiple instructions from instruction cache 204 for up to two threads at the same time. Instruction decode unit 208 decodes multiple instructions for up to two threads at the same time and passes decoded instructions to instruction dispatch unit (IDU) 210. IDU 210 selectively groups decoded instructions from instruction decode unit 208 for each thread, and outputs or issues a group of instructions for each thread to execution units 212, 214, 216, 218, 220, 222, 224, 226, and 228 of the processor.

In an illustrative embodiment, the execution units of the processor may include branch unit 212, load/store units (LSUA) 214 and (LSUB) 216, fixed-point execution units (FXUA) 218 and (FXUB) 220, floating-point execution units (FPUA) 222 and (FPUB) 224, and vector multimedia extension units (VMXA) 226 and (VMXB) 228. Execution units 212, 214, 216, 218, 220, 222, 224, 226, and 228 are fully shared across both threads, meaning that execution units 212, 214, 216, 218, 220, 222, 224, 226, and 228 may receive instructions from either or both threads. The processor includes multiple register sets 230, 232, 234, 236, 238, 240, 242, 244, and 246, which may also be referred to as architected register files (ARFs).

An ARF is a file where completed data is stored once an instruction has completed execution. ARFs 230, 232, 234, 236, 238, 240, 242, 244, and 246 may store data separately for each of the two threads and by the type of instruction, namely general purpose registers (GPR) 230 and 232, floating-point registers (FPR) 234 and 236, special purpose registers (SPR) 238 and 240 and vector registers (VR) 244 and 246. Separately storing completed data by type and by thread assists in reducing processor contention while processing instructions.

The processor additionally includes a set of shared special purpose registers (SPR) 242 for holding program states, such as an instruction pointer, stack pointer, or processor status word, which may be used on instructions from either or both threads. Execution units 212, 214, 216, 218, 220, 222, 224, 226, and 228 are connected to ARFs 230, 232, 234, 236, 238, 240, 242, 244, and 246 through simplified internal bus structure 248.

In order to execute a floating point instruction, FPUA 222 and FPUB 224 retrieves register source operand information, which is input data required to execute an instruction, from FPRs 234 and 236, if the instruction data required to execute the instruction is complete or if the data has passed the point of flushing in the pipeline. Complete data is data that has been generated by an execution unit once an instruction has completed execution and is stored in an ARF, such as ARFs 230, 232, 234, 236, 238, 240, 242, 244, and 246. Incomplete data is data that has been generated during instruction execution where the instruction has not completed execution. FPUA 222 and FPUB 224 input their data according to which thread each executing instruction belongs to. For example, FPUA 222 inputs completed data to FPR 234 and FPUB 224 inputs completed data to FPR 236, because FPUA 222, FPUB 224, and FPRs 234 and 236 are thread specific.

During execution of an instruction, FPUA 222 and FPUB 224 output their destination register operand data, or instruction data generated during execution of the instruction, to FPRs 234 and 236 when the instruction has passed the point of flushing in the pipeline. During execution of an instruction, FXUA 218, FXUB 220, LSUA 214, and LSUB 216 output their destination register operand data, or instruction data generated during execution of the instruction, to GPRs 230 and 232 when the instruction has passed the point of flushing in the pipeline. During execution of a subset of instructions, FXUA 218, FXUB 220, and branch unit 212 output their destination register operand data to SPRs 238, 240, and 242 when the instruction has passed the point of flushing in the pipeline. During execution of an instruction, VMXA 226 and VMXB 228 output their destination register operand data to VRs 244 and 246 when the instruction has passed the point of flushing in the pipeline.

Data cache 256 may also have associated with it a non-cacheable unit (not shown) which accepts data from the processor and writes it directly to level 2 cache/memory 206, thus bypassing the coherency protocols required for storage to cache.

In response to the instructions input from instruction cache 204 and decoded by instruction decode unit 208, IDU 210 selectively dispatches the instructions to execution units 212, 214, 216, 218, 220, 222, 224, 226, and 228 with regard to instruction type and thread. In turn, execution units 212, 214, 216, 218, 220, 222, 224, 226, and 228 execute one or more instructions of a particular class or type of instructions. For example, FXUA 218 and FXUB 220 execute fixed-point mathematical operations on register source operands, such as addition, subtraction, ANDing, ORing and XORing. FPUA 222 and FPUB 224 execute floating-point mathematical operations on register source operands, such as floating-point multiplication and division. LSUA 214 and LSUB 216 execute load and store instructions, which move operand data between data cache 256 and ARFs 230, 232, 234, and 236. VMXA 226 and VMXB 228 execute single instruction operations that include multiple data. Branch unit 212 executes branch instructions which conditionally alter the flow of execution through a program by modifying the instruction address used by IFU 202 to request instructions from instruction cache 204.

IDU 210 groups together instructions that are decoded by instruction decode unit 208 to be executed at the same time, depending on the mix of decoded instructions and available execution units 212, 214, 216, 218, 220, 222, 224, 226, and 228 to perform the required operation for each instruction. For example, because there are only two load/store units 214 and 216, a maximum of two load/store type instructions may be grouped together. In an illustrative embodiment, up to seven instructions may be grouped together (two fixed-point arithmetic, two load/store, two floating-point arithmetic (FPU) or two vector multimedia extension (VMX), and one branch), and up to five instructions may belong to the same thread. IDU 210 includes in the group as many instructions as possible from the higher priority thread, up to five, before including instructions from the lower priority thread. Thread priority is determined by the thread's priority value and the priority class of its process. The processing system uses the base priority level of all executable threads to determine which thread gets the next slice of processor time. Threads are scheduled in a round-robin fashion at each priority level, and only when there are no executable threads at a higher level does scheduling of threads at a lower level take place.

However, IDU 210 dispatches either FPU instructions 222 and 224 or VMX instructions 226 and 228 in the same group with FXU instructions 218 and 220. That is, IDU 210 does not dispatch FPU instructions 222 and 224 and VMX instructions 226 and 228 in the same group. Program states, such as an instruction pointer, stack pointer, or processor status word, stored in SPRs 238 and 240 indicate thread priority 260 to IDU 210.

Instruction completion unit 262 monitors internal bus structure 248 to determine when instructions executing in execution units 212, 214, 216, 218, 220, 222, 224, 226, and 228 are finished writing their operand results to rename buffers 250, 252, 254, or 258. Instructions executed by branch unit 212, FXUA 218, FXUB 220, LSUA 214, and LSUB 216 require the same number of cycles to execute, while instructions executed by FPUA 222, FPUB 224, VMXA 226, and VMXB 228 require a variable, and a larger number of cycles to execute. Therefore, instructions that are grouped together and start executing at the same time do not necessarily finish executing at the same time. "Completion" of an instruction means that the instruction is finishing executing in one of execution units 212, 214, 216, 218, 220, 222, 224, 226, or 228 and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 262 monitors for the completion of instructions, and sends control information 264 to IDU 210 to notify IDU 210 that more groups of instructions can be dispatched to execution units 212, 214, 216, 218, 220, 222, 224, 226, and 228. IDU 210 sends dispatch signal 266, which serves as a throttle to bring more instructions down the pipeline to the dispatch unit, to IFU 202 and instruction decode unit 208 to indicate that it is ready to receive more decoded instructions.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

Figure 3:
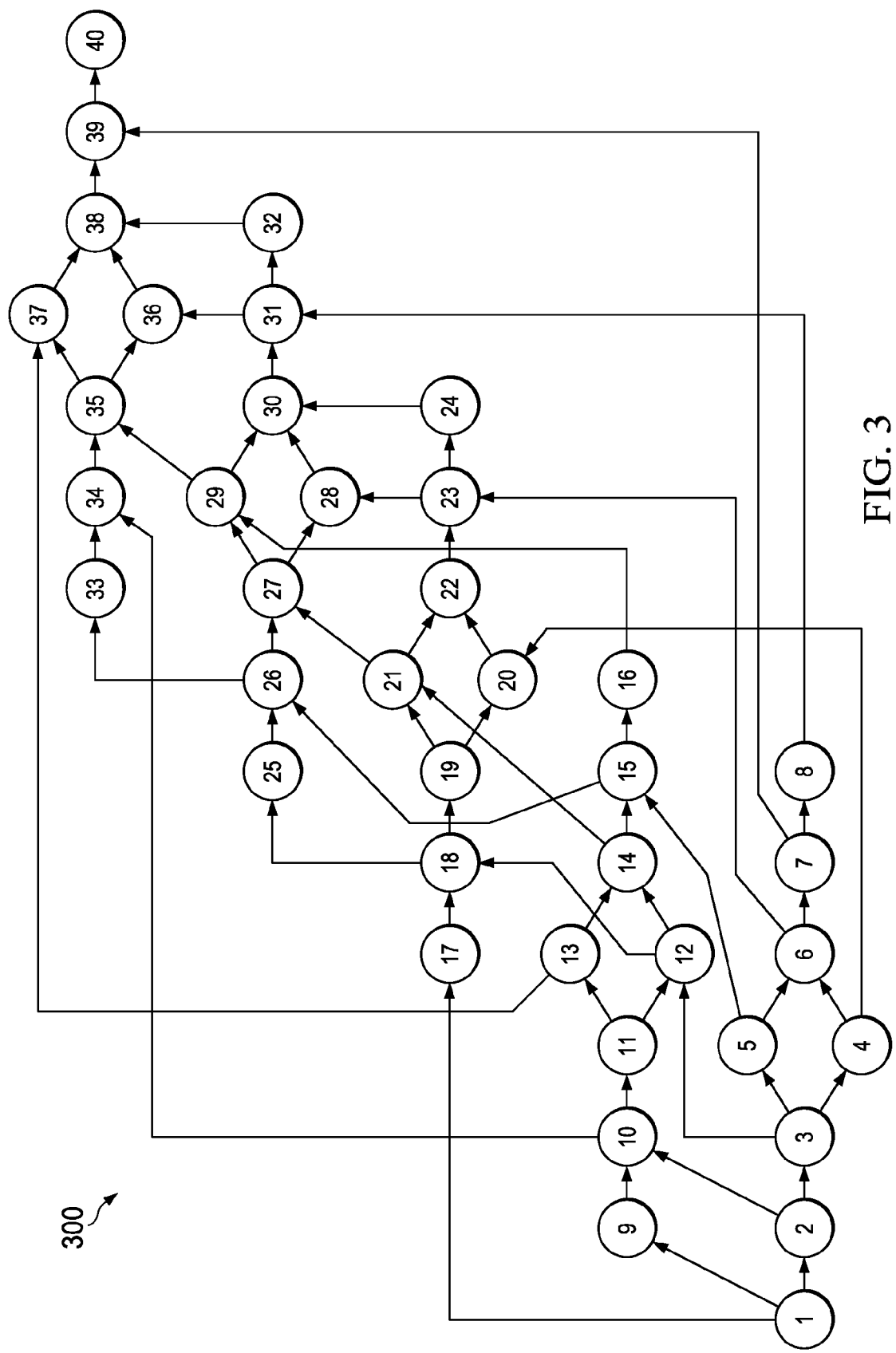
FIG. 3 depicts an example of such a dependence Directed Acyclic Graph (DAG) of an Unstructured Mesh of Transport code (UMT) benchmark for forty iterations in accordance with an illustrative embodiment.

Again, the illustrative embodiments provide mechanisms for detecting task complete dependencies using underlying speculative multi-threading hardware. The mechanisms of the illustrative embodiments track dependencies between threads, and thus tasks executed by threads, utilizing a data structure that effectively represents a speculative task dependence graph (STDG) which is a Directed Acyclic Graph (DAG) that describes dependent relationships among tasks. FIG. 3 depicts an example of such a STDG of an Unstructured Mesh of Transport code (UMT) benchmark for forty iterations in accordance with an illustrative embodiment. In dependence DAG 300, dependencies are considered between iterations; however, the illustrative embodiments are not limited to only these types of iterations. That is, the illustrative embodiment may also arbitrarily group two or more consecutive iterations and consider the group as a unit from which to detect dependencies. Also, if the loop body is large, the illustrative embodiments may also split a single loop iteration into two or more group of consecutive instructions and then consider each group as a unit to detect dependences from. Furthermore, there may be arbitrary control flow (including nested loops) within a unit used to detect dependences from. In another embodiment, a dependence DAG 300 can be constructed from arbitrary sequences of code found in an application, including loop and non-loop section of code with or without control flow.

Dependence DAG 300 may be built statically through compiler analyses. However, due to the uncertainty of memory accesses, statically built dependence DAGs are often too conservative. In other words, statically built dependence DAGs may include many unnecessary edges. On the other hand, at runtime all memory accesses are resolved and a true picture is provided regarding which iterations, or tasks, access the same data unit. Using such dependence information, dependence DAG 300 may be built. To reduce the size of dependence DAG 300, indirect dependence edges may be removed. For example, if iteration (task) 10 is dependent on iteration (task) 5 and iteration (task) 1, while iteration 5's dependency on iteration 1 is already on the DAG, the edge from iteration 10 being dependent on iteration 1 may be considered as not needed. In addition, determining dependences among iterations (a unit of arbitrary many instructions) may be more beneficial when looking at thread-level parallelism because instructions may be too small a unit of work, whereas iterations encompass larger units of work that are better suited for thread level parallelism.

Dependence DAG 300 is built from a benchmark program that simulates interactions among elements in a 2D or 3D space. Dependence DAG 300 illustrates that, for example, iterations (tasks) 2, 9, and 17 are dependent on iteration (task) 1. However, once iteration (task) 1 is complete, iterations (tasks) 2, 9 and 17 may be executed independently of each other. Dependence DAG 300 may be constructed based on code in a loop body, for example.

FIG. 4 depicts an example of code in a loop body in accordance with an illustrative embodiment. Code 400 mainly contains accesses to two arrays, array psifp and array curez, that may cause loop carried dependences. One of the possible dependences is between statement 414 where array curez is defined and statement 404 where array curez is potentially used. Another of the possible dependence is between statement 412 where array psifp is potentially defined and statement 402 where array psifp is used. Accesses to array psifp and array curez may be predicated by the values of two local arrays: afpm 406 and aezm 408. In code 400, both read and write accesses are present. Since values of arrays afpm 406 and aezm 408 are unknown at compilation time, there is no way for the compiler to compute the memory access pattern. Therefore, the compiler gives up parallelizing the loop.

As mentioned earlier, complicated access patterns and dependencies are very difficult to derive using static analysis. As is illustrated in dependence DAG 300 of FIG. 3, opportunities for parallelizing part of the iterations appear to be sporadic. Often, only a small number of iterations exist between a dependent iteration and the iteration on which it depends. However, if some of these opportunities can be captured, the potential speedup may be quite promising.

The illustrative embodiments use the speculative multi-threading hardware of a SMT system to determine the complete dependencies of tasks, e.g., iterations of a portion of code, such as a loop, for purposes of scheduling tasks in such a manner as to minimize abort, rollback, or squashing of threads. In this way, the overhead costs associated with such operations is minimized. The mechanisms of the illustrative embodiments may be used with any type of SMT system that is augmented to implement the additional functionality of the illustrative embodiments. One example of a SMT system in which the illustrative embodiments may be implemented is described in U.S. Patent Application Publication No. 2008/0263280 entitled "Low Complexity Speculative Multithreading System Based on Unmodified Microprocessor Core," assigned to the same assignee as the present application.

As noted in this commonly assigned U.S. Patent Application Publication, to support speculation, a multiprocessor architecture for thread level speculation has to fulfill the following requirements: 1) it has to maintain a notion of the relative order of the threads—i.e., know which thread is executed before some other thread in a sequential program; 2) it has to forward data between parallel threads, or predict data; 3) it has to support mechanism for dependency violation detection—to detect if a read operation has occurred too early; 4) it has to safely discard speculative thread once a dependency violation is detected; 5) it has to commit speculative writes in proper order—only after making sure that this thread would have been executed the same way in a sequential execution; and, 6) it has to re-execute the mis-speculated threads with proper data.

Thread-level speculation takes the sequence of instructions run during an existing uniprocessor program and breaks it into a sequenced group of tasks to be executed by threads that may be run in parallel on a multiprocessor. To ensure that each program executes the same way that it did originally, hardware tracks all inter-thread dependencies. When a "later" thread in the sequence causes a true dependence violation by reading data too early the hardware ensures that the mis-speculated thread, or at least the portion of it following the bad read, re-executes with the proper data. This is a considerably different mechanism from the one used to enforce dependencies on conventional multiprocessors. There, synchronization is inserted so that threads reading data from a different thread will stall until the correct value has been written. This process is complex because it is necessary to determine all possible true dependencies in a program before synchronization points may be inserted.

Speculation allows parallelization of a program into tasks executed by threads even without prior knowledge of where true dependencies between tasks or threads may occur. All threads simply run in parallel until a true dependency in the tasks is detected while the program is executing. This greatly simplifies the parallelization of programs because it eliminates the need for human programmers or compilers to statically place synchronization points into programs by hand or at compilation. All places where synchronization would have been required are simply found dynamically when true dependencies actually occur. As a result of this advantage, uniprocessor programs may be parallelized in a speculative system.

While conventional parallel programmers must constantly worry about maintaining program correctness, programmers parallelizing code for a speculative system can focus solely on achieving maximum performance. The speculative hardware ensures that the parallel code always performs the same computation as the original sequential program. Since parallelization by speculation dynamically finds parallelism among program threads at runtime, it does not need to be as conservative as conventional parallel code. In many programs there are many potential dependencies that may result in a true dependency, but where dependencies rarely if ever actually occur during the execution of the program. A speculative system may attempt to run the threads in parallel anyway, and only back out speculative execution of the later thread if a dependency actually occurs. On the other hand, a system dependent on synchronization must always synchronize at any point where a dependency might occur, based on a static analysis of the program, whether or not the dependency actually ever occurs at runtime.

With the illustrative embodiments, the speculative multithreading (SMT) hardware is augmented to track dependencies dynamically using a speculative versioning cache in which version identifiers are maintained even after an associated thread is transitioned from speculative to non-speculative, i.e. even after a cache line is committed. A thread dependency vector is provided for each thread in which bits are set based on the version identifier of a thread upon which the current thread is dependent. When an execution flow detects that there is a flow dependence, e.g., a read after a write, the version identifier of the write (or store) is obtained and the corresponding bit in the thread dependency vector is set on the thread issuing the read operation. In this way, the hardware generates a speculative task dependence graph (STDG) and updates it dynamically using the SMT hardware mechanisms. The STDG, as specified by the thread dependency vectors of the threads, is then used by a scheduling mechanism, such as by a compiler, scheduler, or other software or hardware mechanism, to schedule tasks for subsequent iterations of portions of code in order to minimize abort, rollback, or squashing of threads.

Figure 5:
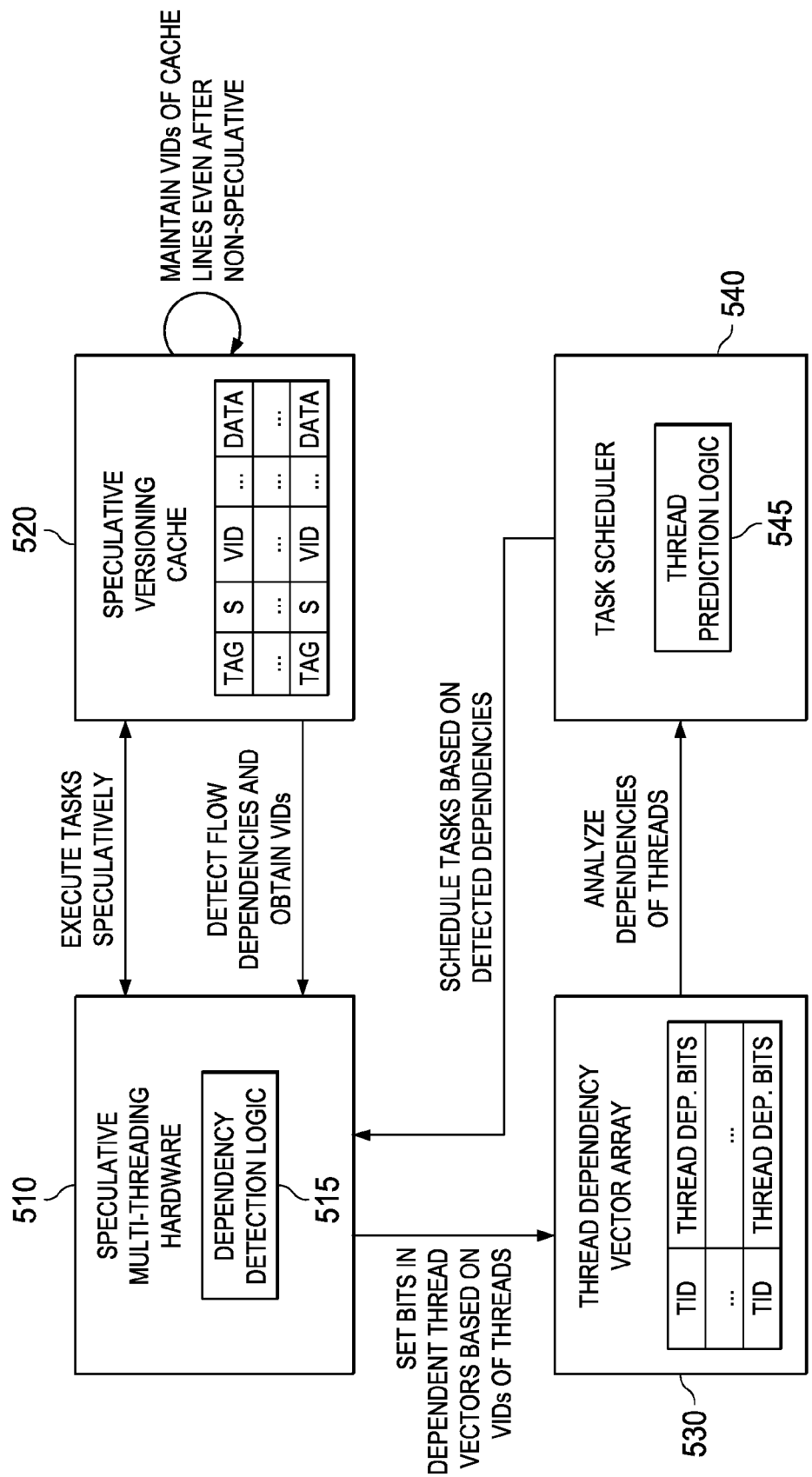
FIG. 5 is an exemplary block diagram illustrating a high level representation of the hardware mechanisms used to implement the mechanisms of the illustrative embodiments.

FIG. 5 is an exemplary block diagram illustrating a high level representation of the hardware mechanisms used to implement the mechanisms of the illustrative embodiments. In one illustrative embodiment, the elements shown in FIG. 5 may be implemented as hardware in a multi-processor system, for example. As shown in FIG. 5, the primary operational elements include speculative multithreading hardware 510, speculative versioning cache 520, a thread dependency vector array 530, and a task scheduler 540. While thread dependency vector array 530 is shown as a separate element in FIG. 5, it should be appreciated that the thread dependency vector array 530 may be integrated with one or more the other elements 510-520 and 540. For example, the thread dependency vector array 530 may be integrated with the speculative versioning cache 520, the speculative multi-threading hardware 510, and/or the task scheduler 540.

The speculative multi-threading hardware 510 may be any known or later developed speculative multi-threading hardware. For example, as noted above, in one illustrative embodiment, the speculative multi-threading hardware 510 may be the hardware described in commonly assigned U.S. Patent Application Publication No. 2008/0263280. The speculative multi-threading hardware 510 provides functionality for executing tasks in parallel using a plurality of threads and hardware mechanisms for detecting dependencies of tasks, and their associated threads, so that changes to data in cache lines of the speculative versioning cache 530 by dependent threads may be squashed when necessary to avoid corrupting the data and ensuring the original sequential ordering of the computer code even though the execution is performed as a plurality of tasks performed in parallel.

The speculative versioning cache 520 is a cache structure that stores multiple versions of cache lines in the cache structure and comprises version control logic that supports speculative versioning based on version identifiers (VIDs) of cache lines as generated by threads accessing these cache lines. Speculative versioning caches 520 work in conjunction with speculative multi-threading hardware 510 to buffer memory locations until threads that are executed speculatively are converted to a non-speculative sate or the task is committed. Multiple versions of a cache line are preserved in the speculative versioning cache 520 with a version identifier (VID) being used to distinguish versions of a cache line in the system.

With speculative versioning cache 520, copies of cache lines are generated in response to a speculative write (or store) operation to the cache line. It should be noted that a speculative write (or store) to a cache line does not invalidate other versions of the cache line. A speculative write (or store) is defined as a write (or store) that is performed by a thread that is speculative. The copy of the cache line is marked as speculative and a VID, generated by the thread performing the write (or store) operation is stored in the cache line. Cache lines having a speculative state cannot be evicted from the speculative versioning cache 520 because these cache lines have not yet been backed in the architected storage, e.g., main memory. Cache lines having a speculative state are copied to the architected storage only in response to a task prediction being validated and the task being committed. Tasks are committed one by one in the order of the sequence of tasks corresponding to the program order of the original code. For more information on speculative versioning caches, references is made to the example of a speculative versioning cache described in Gopal et al., "Speculative Versioning Cache," Proceedings of the 4$^{th}$ International Symposium on High-Performance Computer Architecture, Jan. 31 to Feb. 4, 1998, page 195.

In accordance with the mechanisms of the illustrative embodiments, the speculative versioning cache 520 stores, for each cache line in the speculative versioning cache 520, a tag indentifying the cache line and thus, the data present in the cache line for purposes of lookup operations and cache hit/ miss checking, a speculative bit indicating whether the cache line has a speculative state or is a committed cache line, and a version identifier (VID) that identifies the corresponding version of the cache line. The VID differentiates the cache line from other versions of the same cache line that have a different VID.

The relationship between threads and VIDs is as follows. Threads execute code and have their own private state, typically stored in registers. Threads that execute non-speculative parts of the code have no associated VIDs, as there is no need to undo writes (stores) associated with non-speculative threads. As a thread enters a speculative portion of the code, it must acquire a unique, unused VID so as to tag each of its writes (stores) with this unique VID. By tagging each of the writes (stores) with this VID in the version cache, this allows the system to squash any side effects associated with this speculative thread if it is determined that the speculation was erroneous and/or must be squashed for other reasons. This squashing is performed by labeling each cache line associated with this VID as an invalid cache line in the version cache. As a thread successfully completes a speculative portion of the code, it will release the VID, and will stop tagging its writes (stores) with this VID as it is not in a speculative portion of code anymore. This specific VID may not be immediately reused by this or another thread, as this VID field may still be present in some of the VID fields inside the speculative versioning cache. Once it is not in use anymore, the VID can then be used again, by this or by another thread in the system, to flag the writes (stores) of a new speculative portion of the code.

In one illustrative embodiment, a dedicated speculative bit is used to indicate whether a cache line includes speculative data. In other illustrative embodiments, a dedicated speculative bit per cache line may not be used, but instead a mapping mechanism may be used that indicates, for each VID, whether a given VID is associated with a speculative thread or whether the given VID is associated with a thread that is not speculative.

With the mechanisms of at least one illustrative embodiment, the VID of a cache line is maintained in the speculative versioning cache 520 even after the thread associated with the cache line is determined to be non-speculative. In known systems, there is generally no need to preserve a VID associated with a cache line that is associated with a thread that is no longer speculative, as the main purpose of such VID is to enable the squashing of speculative data in the event of a determination that a speculative thread violated a data dependence. In this illustrative embodiment, however, the VID is preserved past determining that the thread associated with this VID is non-speculative. It should be noted that, for the purpose of correctness of the program, the illustrative embodiment does not rely on preserving the VID of non-speculative threads. In other words, it is possible that a non-speculative cache line be replaced in the cache and be backed in main memory (i.e., written back to main memory), where the VID field may or may not be backed in main memory as well as the data. In addition, it should be noted that loosing the VID associated with a non-speculative thread does not need to be linked to backing a cache line into main memory, as the VID field of a non-speculative cache line could be destroyed for other non-specified reasons.

The VID is used, as described hereafter, to set bits in a thread dependency vector corresponding to the VID to identify the tasks upon which other tasks are dependent. The speculative versioning cache 520 may maintain a correspondence data structure (not shown) that correlates the threads executing in the data processing system with the VIDs of the cache lines. This correspondence is used to identify the particular tasks and threads that are dependent upon each other as described hereafter.

The thread dependency vector array 530 stores a thread dependency vector for each thread executing in the data processing system. Thread dependency vector may have an associated thread identifier (TID) correlating the thread dependency vector with a corresponding thread, and a plurality of VID dependency identifier bits. The number of VID dependency identifier bits provided in each thread dependency vector corresponds to the maximum number of VIDs supported by the data processing system. For example, in one illustrative embodiment, the data processing system may support up to 128 VIDs, and thus up to 128 concurrent speculative units of work. As a result, each thread dependency vector in the array 530 may have 128 VID dependency identifier bits, one for each possible VID. It should be noted that the maximum number of VIDs will typically be greater than the number of possible simultaneous threads and thus, the size of the array 530 may be kept relatively small. For example, in one illustrative embodiment, the data processing system may be a simultaneous multithreaded data processing system that supports up to four simultaneously executing threads (SMT4) and, as a result, the array 530 may contain 4 thread dependency vectors with each vector having 128 VID dependency bits. Other implementations may only support two simultaneously executing threads (SMT2) or more than four simultaneously executing threads. In this illustrative embodiment, there is one dependence vector per thread. In other illustrative embodiments, there may be one dependence vector per VID in the system. In still other illustrative embodiments, a smaller number of dependence vectors may be provided than the total number of threads or VIDs present in the system, and provide a mapping from threads/VIDs to the given subset of dependence vectors in the dependency vector array 530.

Each VID dependency identifier bit in a thread dependency vector corresponds to one of the possible concurrent units of work corresponding to a VID. The speculative multi-threading hardware 510 comprises additional dependency detection logic 515, beyond the logic of speculative multi-threading hardware generally known in the art, that obtains the VID of the cache line to which an operation is performed by a first thread, upon which an operation executed by a second thread is dependent. The obtaining of this VID is performed in response to the speculative multi-threading hardware 510 detecting an execution flow dependency between threads, e.g., a read (or load) operation after a write (or store) operation. The dependency detection logic 515 uses the VID of the cache line upon which a dependent thread is dependent to set a corresponding VID dependency bit in the thread dependency vector for the dependent thread. In this way, the speculative multi-threading hardware 510 dynamically tracks dependencies of threads as they execute tasks speculatively. This tracking is used to update the thread dependency vectors of the thread dependency vector array 530 which are then used to schedule the tasks, and thus the threads, such that dependency violations are minimized. This in turn minimizes the overhead costs of squashing threads due to dependency violations.

The thread dependency vector array 530 essentially provides a speculative task dependence graph (STDG) between the tasks of the various threads by identifying which tasks of which threads are dependent upon each other. This STDG representation in the thread dependency vector array 530 is generated dynamically by the hardware of the illustrative embodiments and updated dynamically as speculative execution of threads and their corresponding tasks is performed.

Thus, for example, referring again to the STDG of FIG. 3, a first thread may be used to execute tasks of a first path through the STDG, e.g., tasks 1, 2, 3, 4, 6, 7, 39, and 40. A second thread may be used to execute tasks of a second path through the STDG, e.g., tasks 9, 10, 11, 13, 37, and 38. The second thread executing iteration or task 9 may have a corresponding thread dependency vector with a VID dependency identifier bit corresponding to the cache line written to by the second thread executing task 1 that is set to indicate a dependence of task 9 on task 1. Thus, the thread dependency vectors indicate that the second thread executing task 9 is dependent on the first thread executing task 1.

The task scheduler 540 may analyze the thread dependency vectors of the thread dependency vector array 530 and predict a relative ordering of tasks and threads that minimizes the possibility of dependency violations and resultant squashing of threads. For example, the thread prediction logic 545 may read and process the VID dependency identifier bits of the various thread dependency vectors and determine which tasks and threads are dependent upon each other. The thread prediction logic 545 may then reorder tasks and their corresponding thread execution such that dependent tasks and threads are ordered after the tasks and threads upon which they are dependent with regard to execution order.

As discussed above, dependencies between tasks are determined by the speculative multithreading hardware 510 in response to it dependency tracking logic 515 identifying a flow dependency in the speculative execution of tasks. The speculative multithreading hardware 510 may include special software called a violation interrupt handler for handling dependency violations identified in such flow dependencies. When the dependency tracking logic 515 detects that there is a flow dependency, the dependency tracking logic 515 obtains the VID bit of the cache line accessed by the non-dependent thread and sets a corresponding VID dependency bit in the thread dependency tracking vector of the dependent thread.

Figure 6:
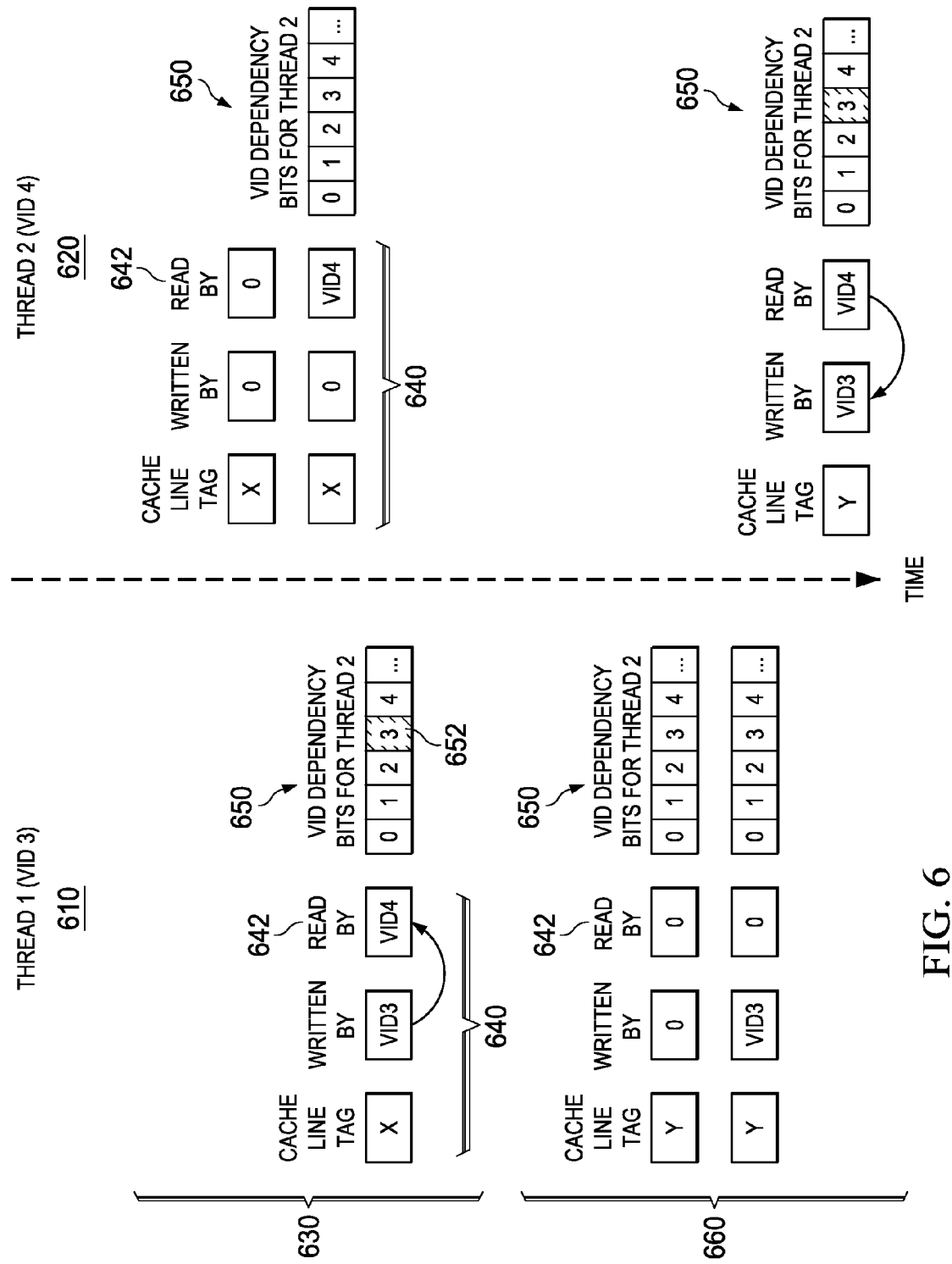
FIG. 6 is an example of a flow dependency and a corresponding setting of VID dependency bits in accordance with one illustrative embodiment.

FIG. 6 is an example of a flow dependency and a corresponding setting of VID dependency bits in accordance with one illustrative embodiment. As shown in FIG. 6, an older speculative thread (thread 1 with VID 3) 610, i.e. a thread that is spawned and executed earlier in another younger speculative thread (thread 2 with VID 4) 620 that is spawned and executed later in an execution flow, is shown on the left side of the diagram while the younger thread 620 is shown on the right side of the diagram. In a first scenario 630, a cache line 640 having the corresponding tag "X" is read by a thread 2 620 with VID 4 and sets the "Read by" field 642 to the VID associated with thread 2 620, namely VID 4. Because this is a read operation, and there has not been a prior write operation to the cache line 640, no dependency violation exists.

However, thereafter the older thread (thread 1 with VID 3) 610 performs a write operation to the cache line "X" resulting in a flow dependency in that the value read by the younger thread (thread 2 with VID 4) 620 is dependent upon the value written by the older thread (thread 1 with VID 3) 610. In addition, a dependency violation is present in this scenario 630 in that the value read by the younger thread (thread 2) 620 may be incorrect since it occurred prior to the write to the cache line by the older thread (thread 1) 610. The mechanisms of the illustrative embodiments, having detected the dependency between thread 1 610 and thread 2 620 as described previously, sets the VID dependency bit 652 of the thread dependency tracking vector 650 corresponding to the younger thread (thread 2) 620, i.e. the dependent thread, to indentify that the execution of the younger thread (thread 2) 620 is dependent upon the execution of the operation corresponding to the VID 3 of the task executed on the older thread (thread 1) 610 that performs the write operation to the cache line 640. Thus, when an older thread issues a write operation and a younger thread has previously read from that cache line to use the value of the data for some operation, the VID dependency bits of the thread dependency tracking vector for the younger thread are set to indicate the dependence of the younger thread on the older thread with regard to the particular task performed by the older thread that writes to the cache line.

Scenario 660 in FIG. 6 shows another possible flow dependency that may be detected using the dependency tracking logic 515 of the speculative multi-threading hardware 510 in FIG. 5. In this scenario 660, the older thread (thread 1 with VID 3) 610 writes to the cache line "Y" prior to the younger thread (thread 2 with VID 4) 620 reading from the cache line "Y". In this case, there is no dependency violation, however there is still a flow dependency detected. Thus, the mechanisms of the illustrative embodiments will still set the appropriate VID dependency bit in the thread dependency tracking vector of the younger thread (thread 2 with VID 4) 620 indicating that the younger thread's execution is dependent upon the older thread's execution of the task corresponding to the VID dependency bit set. Hence, when a younger thread issues a read operation on a cache line, and an older thread wrote to the cache line, the VID dependency bit in the thread dependency tracking vector of the younger thread is set to indicate that the younger thread's execution is dependent upon the task corresponding to the VID of the cache line written to by the older thread.

When the older thread is re-started, VID dependency bits of the thread dependency vectors for the various tasks performed by older thread are cleared in each of the thread dependency vectors of the various threads. Moreover, output dependencies and anti-dependencies can be ignored since the speculative versioning cache 520 in FIG. 5 maintains multiple versions of cache lines thereby avoiding output dependency and anti-dependency violations. An anti-dependence is defined as the dependence that occurs when an older thread reads a value and a newer thread later over-writes that same value with a new value. In general, one must ensure that the newer thread does not over-write the values before the older thread has had a chance to read it. In the presence of a speculative versioning cache, since the newer thread will write its value in a new version of the cache line, anti-dependences are not an issue. An output dependence is defined as the dependence that occurs when an older thread writes a value and a newer thread later over-writes that same value. In general, one must make sure that the older thread writes the value first and the newer thread writes its value second. Again, in the presence of a speculative versioning cache, output dependences are not an issue as both speculative threads will generate their write (store) in their own version of the cache line in the speculative versioning cache.

Thus, the mechanisms of the illustrative embodiments utilize speculative multi-threading hardware that is augmented to track dependencies of tasks of the various threads in thread dependency tracking vectors. These thread dependency tracking vectors may then be analyzed to identify dependencies of tasks and their corresponding threads. These dependencies can be used to schedule the execution of tasks and threads.

For example, assume that the illustrative embodiment discovered the dependences shown in FIG. 3 during one execution phase. Assume that the computation now returns to a new evaluation of tasks 1 to 40 in FIG. 3. From this dependence graph, a scheduler can assign Tasks 1, 2, 3, 5, 15, 16, 29, 30, 31, 32, 38, 39, and 40 to Thread 1. It can assign Tasks 9, 10, 11, 12, 14, 21, 27 and 28 to Thread 2. Continuing with this algorithm, the scheduler can pick further unassigned tasks to assign to threads, picking in the graph strands of connected tasks that have not yet been assigned to threads. It is also possible to assign multiple strands of connected tasks to a single thread, depending on the number of threads available on the target machine and other performance considerations. The scheduler can also indicate more precise instructions to be assigned to each thread. For example, based on the graph shown in FIG. 3, the scheduler can instruct Thread 1 to initiate threads 2, 3, and 5 one at a time, in this order, wait for the completion of Task 14, then initiate Task 15 and 16, wait for the completion of Task 27, initiate Task 29, wait for completion of Tasks 24 and 28, initiate Task 30, wait for the completion of Task 8, initiate Tasks 31 and 32, wait for the completion of Tasks 36 and 37, and then initiate Tasks 38, 39, and 40. The scheduler can provide similar instructions to other threads as well. Note that those skilled in the art will concur that there are multiple assignments of tasks to threads, each with distinct characteristics, such as the amount of parallelism available between threads the number of synchronization (i.e. number of time a given thread has to wait for the completion of one or more tasks performed by other threads), and the like. The role of a scheduler is to find a given assignment that exhibits good performance, namely minimizes the total amount of time that is needed for the complete executions of tasks 1 to 40, in this example.

Figure 7:
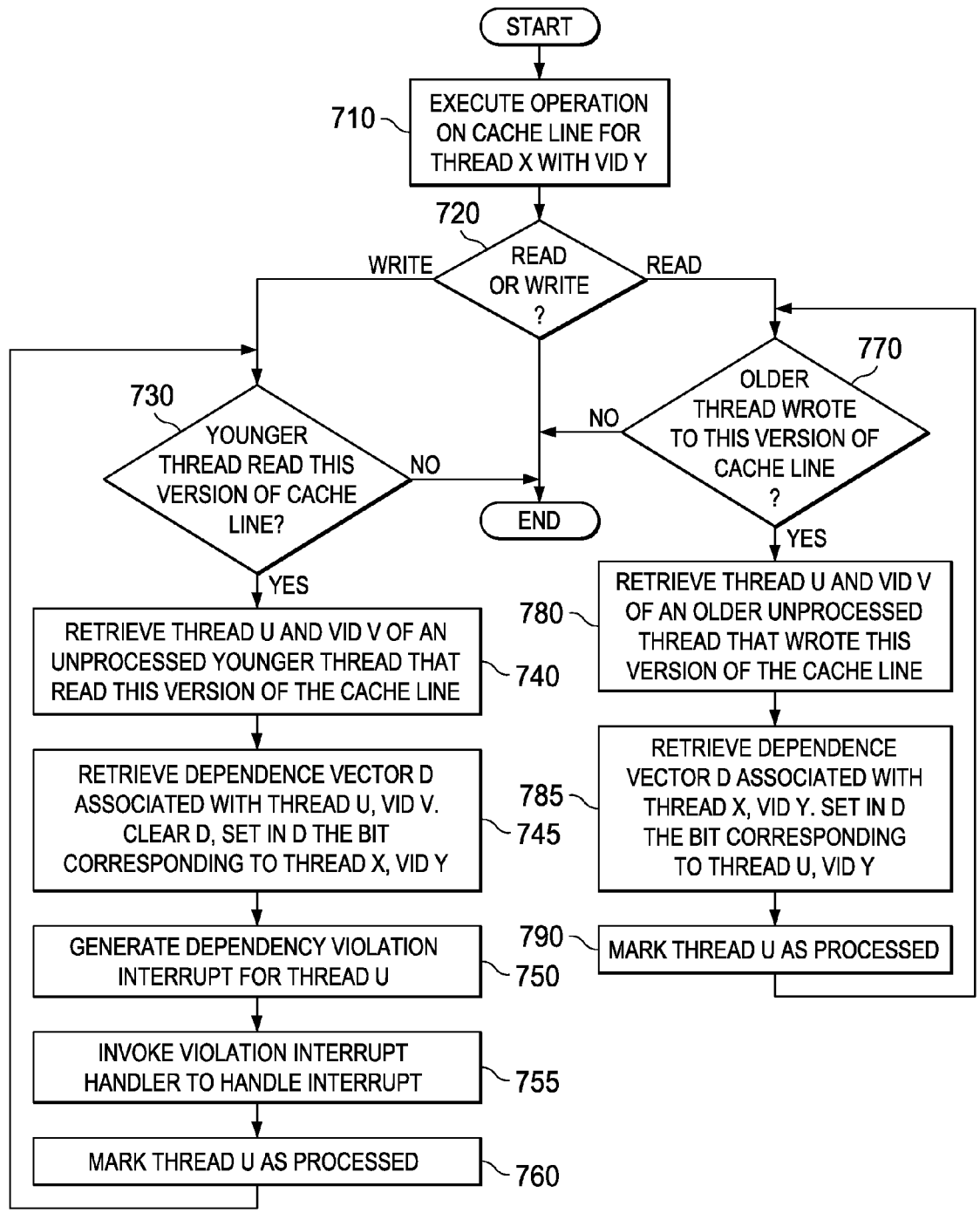
FIG. 7 is a flowchart outlining an example operation of tracking task/thread dependencies using speculative multi-threading hardware and thread dependency vectors in accordance with one illustrative embodiment.

FIG. 7 is a flowchart outlining an example operation of tracking task/thread dependencies using speculative multi-threading hardware and thread dependency vectors in accordance with one illustrative embodiment. The operation outlined in FIG. 7 may be implemented, for example, by dependency tracking logic 515, for example, utilizing the thread dependency vector array 530 and speculative versioning cache 520 of FIG. 5.

As shown in FIG. 7, the operation starts by a current thread, having thread identifier X and version identifier VID Y, executing an operation on a cache line of a speculative versioning cache (step 710). A determination is made as to whether the operation is a read or a write operation (step 720). If the operation is a write operation, a determination is made as to whether there is an unprocessed younger thread that read this version of the cache line written to by the current thread (step 730). An unprocessed thread is defined as a thread that executes in speculative mode and whose state has not yet been committed. An unprocessed thread Y is younger than another unprocessed thread X if thread Y is associated with a task that executes after the task associated with thread X, in the original program order. Similarly, an unprocessed thread X is older than another unprocessed thread Y if thread X is associated with a task that executes before the task associated with thread Y, in the original program order.

If there is an unprocessed younger thread that read this version of the cache line written to by the current thread, then the thread identifier (thread U) and version identifier (VID V) of the unprocessed younger thread that read this version of the cache line is retrieved (step 740). A dependence vector D associated with the combination of the thread identifier and VID, i.e. thread U and VID V, is retrieved. The dependence vector D is cleared and a bit corresponding to thread X and VID Y, i.e. the thread identifier and version identifier of the current thread, is set in the dependence vector D (step 745).

A dependency violation interrupt for the younger thread, thread U, is generated (step 750) and a violation interrupt handler is invoked to handle the dependency violation, such as by squashing the dependent thread(s) (step 755). The younger thread, thread U, is marked as having been processed by the dependency tracking logic (step 760) and the operation returns to step 730 to determine if there are any further younger threads that read this version of the cache line. If a younger thread did not use the cache line written to by the current thread (step 730), or if no further younger threads used the cache line written to by the current thread, the operation terminates.

If the operation is a read operation (step 720), then a determination is made as to whether an unprocessed older thread wrote to the version of the cache line targeted by the read operation (step 770). If so, then the thread identifier, thread U, and VID, VID V, of the older unprocessed thread that wrote to this version of the cache line is retrieved (step 780). A dependency vector D associated with the thread X and VID Y of the current thread is retrieved and a bit corresponding to thread U and VID V is set in the dependency vector D (step 785). The thread identified by thread U is then marked as processed (step 790) and the operation returns to step 770 to determine if there are any further unprocessed older threads that wrote to this version of the cache line. If there is not an unprocessed older thread that wrote to this version of the cache line, or if there are no further unprocessed older threads that wrote to this version of the cache line, then the operation terminates.

It should be noted that the dependence vector D is cleared in step 745 because it is possible that some of the dependences discovered during the speculative execution of the thread are wrong, as the speculative thread U was working on data that the system just discovered as being potentially inaccurate (thus the need for invoking the Violation Interrupt Handler which will lead in re-executing the task associated with thread U). However, it if is deemed desirable to preserve past dependence information, even though some of it may be inaccurate, then one can omit the clearing of dependence vector D in step 745.

Figure 8:
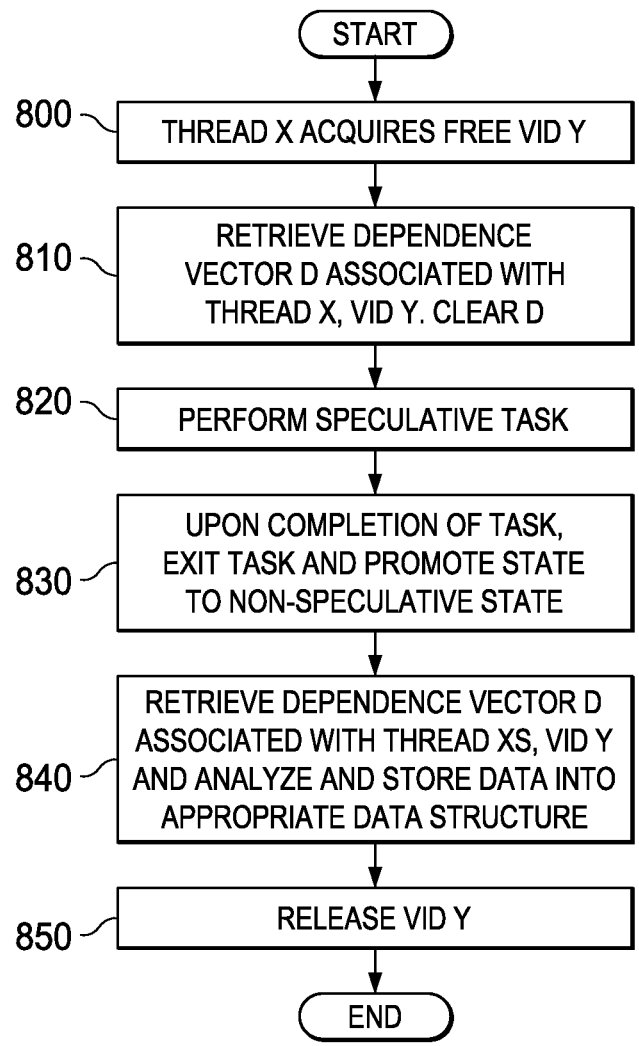
FIG. 8 is a flowchart outlining an example operation of an overall process for executing a speculative thread using the dependency tracking mechanism outlined in FIG. 7 in accordance with one illustrative embodiment.

FIG. 8 is a flowchart outlining an example operation of an overall process for executing a speculative thread using the dependency tracking mechanism outlined in FIG. 7 in accordance with one illustrative embodiment. As shown in FIG. 8, the operation starts with a thread, i.e. a thread with thread identifier X, acquiring a free version identifier (VID), in this case VID Y (step 800). A dependence vector D for the combination of thread X and VID Y is obtained and cleared if necessary (step 810). That is, the dependence vector D may be created or assigned to the combination of the thread identifier X and VID Y. If the dependence vector D is one that is being reused and assigned to thread X, VID Y, it needs to be cleared before being used to track dependencies for thread X, VID Y.

Having obtained a dependence vector D associated with thread X and VID Y, the thread, i.e. thread X, performs its speculative task (step 820). As part of the execution of the speculative task, dependencies between the thread and other threads in a flow of the execution of the speculative task are tracked using the dependency vector D in the manner previously described above. Upon completion of the speculative task, the speculative task is exited and its state is promoted in the speculative version cache to a non-speculative state (step 830).

A scheduler, which is responsible for scheduling the execution of threads in the parallel execution of a computer program, may retrieve the dependence vector D, a compiler, or the like, may analyze the dependencies tracked in the dependency vector D, and determine an optimum scheduling of tasks and threads so as to optimizing the execution of the program by reducing dependency violations (step 840). Such analysis may involve, for example, generating a dependency graph based on the dependency vector D and determining the schedule of tasks/threads based on the dependency graph generated from the dependency vector D. Another such analysis may involve, for example, the generating of an approximate dependency graph that is more compact and results in nearly the same amount of available parallelism. The scheduler, complier or the like, may store the determined schedule of tasks/threads for later use in executing the computer program code. Thereafter, the VID Y may be released for reuse (step 850) and the operation terminates.

Figure 9:
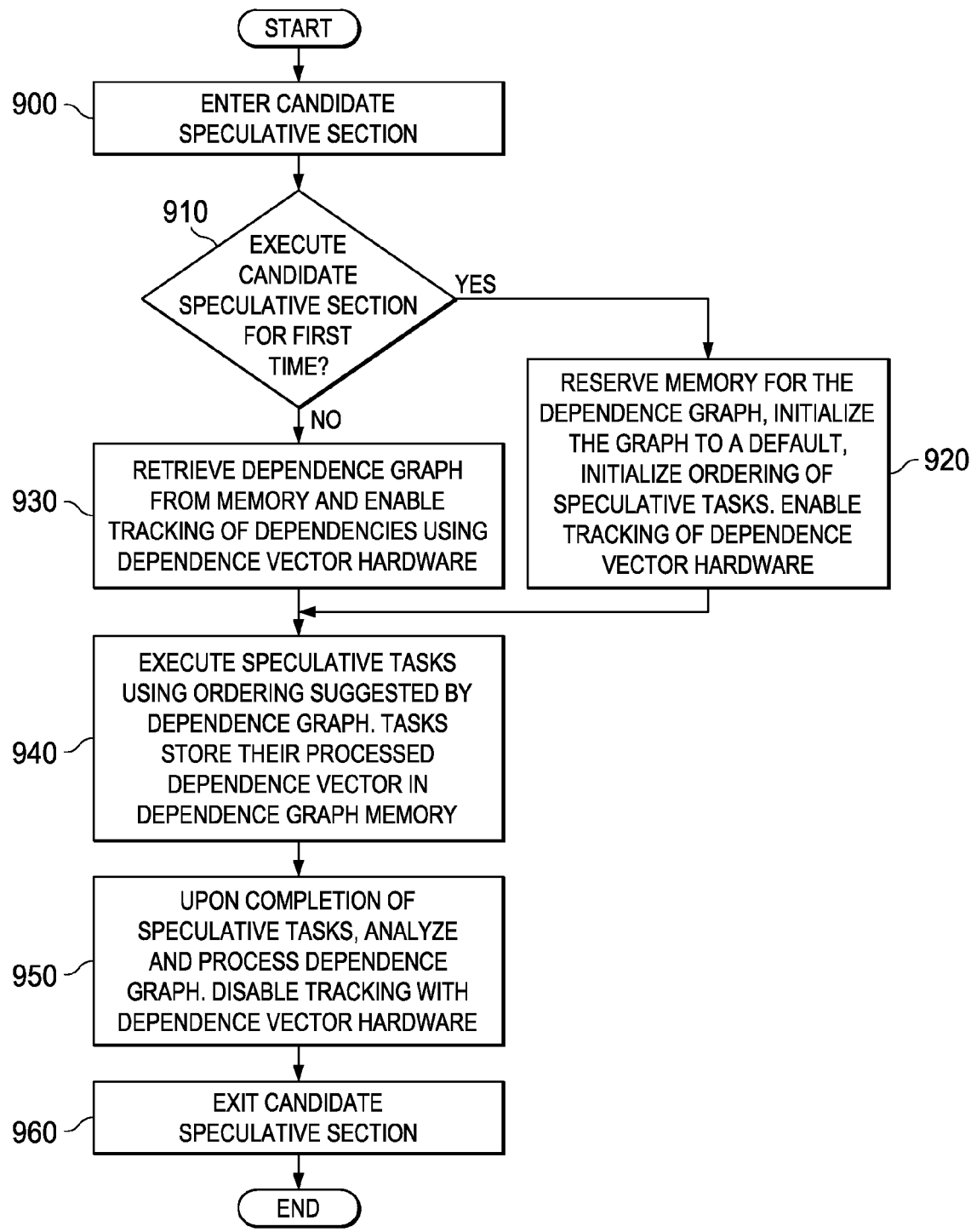
FIG. 9 is a flowchart outlining an example operation of generating a dependency graph using the dependency tracking vectors of the illustrative embodiments so that the dependency graph may be used to schedule tasks/threads in accordance with one illustrative embodiment.

FIG. 9 is a flowchart outlining an example operation of generating a dependency graph using the dependency tracking vectors of the illustrative embodiments so that the dependency graph may be used to schedule tasks/threads in accordance with one illustrative embodiment. As shown in FIG. 9, the operation starts with the execution of the computer program entering a portion of the computer program code that is a candidate for speculative execution (step 900). A determination is made as to whether the candidate speculative section of code is being executed for the first time (step 910). Such a determination may be made, for example, based on a counter or indicator maintained by the compiler, scheduler, or the like, that identifies whether a section of code has been entered or even how many times a section of code has been entered during execution of the computer program. If such a counter has a value other than zero, then it can be determined in step 910 that the section of code has been executed previously.

If the section of code is being entered for the first time, a portion of memory is reserved for the dependence graph for this candidate speculative section of code, a dependence graph for the candidate speculative section of code is initialized to a default graph, and tracking of dependencies using a dependence vector and the dependence tracking hardware of the illustrative embodiments is enabled (step 920). It should be noted that here the dependency graph for this candidate speculative section does not yet exist and a default graph is used based on a compiler's analysis of the code, without tracking dependencies, and determining an initial estimate of a way in which to parallelize the section of code. If the section of code has been entered previously, then the dependence graph for this candidate speculative section is retrieved from memory and tracking of dependencies using the dependency vectors and dependency tracking hardware of the illustrative embodiments is enabled (step 930). Here, the dependence graph has been previously created during a previous execution of this section of code and thus, is retrieved and updated by the mechanisms of the illustrative embodiments.

Thereafter, speculative tasks of the candidate speculative section of code are executed using the ordering of such tasks suggested by the dependence graph (step 940). During the execution of these speculative tasks, dependencies between tasks and their threads are tracked using the dependency vectors and the dependency tracking hardware of the illustrative embodiments. Upon completion of the speculative tasks, the dependency vector(s) associated with the candidate speculative section of code are analyzed to generate an updated dependence graph, and tracking of dependencies using the dependency vectors and dependency tracking hardware is then disabled (step 950). The execution of the speculative section of code is exited (step 960).

It should be noted that, upon the next entry into the speculative section of code, the updated dependency graph will be used to order the tasks/threads so as to achieve an optimum execution of the candidate speculative section based on a minimization of dependency violations. The dependency graph may be dynamically updated with each entry into the candidate speculative section of code, if necessary. If multiple entries into the candidate speculative section of code occur with no modifications to the dependency graph, then the mechanisms of the illustrative embodiments may be disabled so as to avoid dependency tracking when no appreciable benefit will be obtained.

Thus, the illustrative embodiments provide mechanisms for using existing speculative multithreading hardware of a system and augmenting it to include logic for tracking dependencies between tasks and threads within a thread dependency vector array. Moreover, the mechanisms of the illustrative embodiments provide analysis logic for analyzing the dependency information maintained in the thread dependency vector array to determined task and thread dependencies and generate a schedule of tasks/threads that minimizes dependency violations. In this way, the extra overhead costs of squashing threads due to dependency violations is avoided.

It should be noted that in the above embodiments, the dependency vector associated with a given thread X is implemented by a vector of bits where each bit determines if the current thread is dependent on the corresponding task associated with this bit's VID. In these embodiments, it has been selected to describe the set of VIDs that thread X is dependent on using a vector of bits. However, those of ordinary skill in the art of computer architecture will appreciated, in view of the present description, that there are other hardware structures that may be used to represent such a set of VIDs. In one other embodiment, for example, one can use a finite list of VIDs where the Dependency Detection Logic 515 may append to the list, a finite number of VIDs that the given thread X is dependent upon. Because the information recorded here is simply to assist extracting performance, and not needed for the correctness of the execution of the program, it is acceptable to not necessarily record all VIDs that a given thread X is dependent upon.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for tracking dependencies of threads in a multi-threaded computer program execution, comprising:

detecting, by a processor of the data processing system, a dependency of a first thread's execution on results of a second thread's execution in an execution flow of the multi-threaded computer program;

storing, by the processor, in a hardware thread dependency vector storage associated with the first thread's execution, an identifier of the dependency by setting at least one bit in the hardware thread dependency vector storage corresponding to the second thread; and scheduling, by the processor, tasks performed by the multi-threaded computer program based on a state of bits in the hardware thread dependency vector storage, wherein the first thread is a speculative thread having an associated version identifier for use with a speculative versioning cache, and wherein the at least one bit in the hardware thread dependency vector storage corresponding to the second thread corresponds to the version identifier associated with the second thread.

2. The method of claim 1, wherein the hardware thread dependency vector storage comprises a plurality of bits, one bit for each possible version identifier supported by an architecture of the data processing system, such that a total number of bits in the plurality of bits is a maximum number of version identifiers supported by the architecture.

3. The method of claim 1, wherein scheduling tasks performed by the multi-threaded computer program based on the thread dependency vector comprises:

generating a speculative task dependence graph (STDG); and updating the STDG dynamically using the hardware thread dependency vector storage.

4. The method of claim 1, wherein detecting a dependency between of a first thread's execution on results of a second thread's execution in an execution flow of the multi-threaded computer program comprises detecting that the first thread's execution performs a speculative read of a cache line written to by the second thread's execution.

5. The method of claim 1, wherein detecting a dependency of the first thread's execution on results of a second thread's execution in an execution flow of the multi-threaded computer program occurs even when the first thread speculatively executed with a correct value produced by the second thread and no dependence violation is detected.

6. The method of claim 1, further comprising:

performing, by the first thread, one of a read operation or a write operation on a version of a cache line of a speculative versioning cache in the data processing system, wherein detecting a dependency of the first thread's execution on results of a second thread's execution in an execution flow of the multi-threaded computer program comprises:

determining if the first thread has written to the version of the cache line, and in response to the first thread having written to the version of the cache line, performing the following operations:

determining whether an unprocessed younger thread read this version of the cache line written to by the first thread;

in response to an unprocessed younger thread having read this version of the cache line, retrieving a thread identifier (TID) and version identifier (VID) of the unprocessed younger thread that read this version of the cache line;
retrieving a thread dependency vector (D) associated with the combination of the TID and VID of the unprocessed younger thread; and
clearing the thread dependency vector and setting a bit in the thread dependency vector (D) corresponding to a thread identifier and a version identifier of the first thread.

7. The method of claim 6, wherein, in response to the first thread having read the version of the cache line, the method performs the following operations:
determining whether an unprocessed older thread wrote to this version of the cache line written to by the first thread;
in response to an unprocessed older thread having written to this version of the cache line, retrieving a TID and VID of the unprocessed older thread that wrote to this version of the cache line;
retrieving a thread dependency vector associated with the first thread; and
setting a bit, corresponding to the TID and VID of the unprocessed older thread, in the thread dependency vector of the first thread.

8. A method, in a data processing system, for tracking dependencies of threads in a multi-threaded computer program execution, comprising:
detecting, by a processor of the data processing system, a dependency of a first thread's execution on results of a second thread's execution in an execution flow of the multi-threaded computer program;
storing, by the processor, in a hardware thread dependency vector storage associated with the first thread's execution, an identifier of the dependency by setting at least one bit in the hardware thread dependency vector storage corresponding to the second thread;
scheduling, by the processor, tasks performed by the multi-threaded computer program based on a state of bits in the hardware thread dependency vector storage; and
obtaining a version identifier (VID) of a cache line in a speculative versioning cache accessed by the second thread, in response to the processor detecting the dependency, wherein the at least one bit in the hardware thread dependency vector storage is at least one bit corresponding to the VID of the cache line accessed by the second thread.

9. A method, in a data processing system, for tracking dependencies of threads in a multi-threaded computer program execution, comprising:
detecting, by a processor of the data processing system, a dependency of a first thread's execution on results of a second thread's execution in an execution flow of the multi-threaded computer program;
storing, by the processor, in a hardware thread dependency vector storage associated with the first thread's execution, an identifier of the dependency by setting at least one bit in the hardware thread dependency vector storage corresponding to the second thread; and
scheduling, by the processor, tasks performed by the multi-threaded computer program based on a state of bits in the hardware thread dependency vector storage, wherein detecting a dependency of the first thread's execution on results of a second thread's execution in an execution flow of the multi-threaded computer program comprises:
tracking, in each cache line of a speculative cache, a first version identifier associated with a last thread to have read the cache line and a second version identifier associated with a last thread to have written to the cache line; and
determining dependencies based on the first and second version identifiers.

10. The method of claim 9, wherein the first version identifier and second version identifier are maintained even after corresponding threads have changed state from a speculative state of execution to a non-speculative state of execution.

11. A computer program product comprising a non-transitory computer recordable medium having a computer readable program recorded thereon, wherein the computer readable program, when executed on a computing device, causes the computing device to:
detect a dependency of a first thread's execution on results of a second thread's execution in an execution flow of a multi-threaded computer program;
store, in a hardware thread dependency vector storage associated with the first thread's execution, an identifier of the dependency by setting at least one bit in the hardware thread dependency vector storage corresponding to the second thread; and
schedule tasks performed by the multi-threaded computer program based on a state of bits in the hardware thread dependency vector storage, wherein the first thread is a speculative thread having an associated version identifier for use with a speculative versioning cache, and wherein the at least one bit in the hardware thread dependency vector storage corresponding to the second thread corresponds to the version identifier associated with the second thread.

12. The computer program product of claim 11, wherein the hardware thread dependency vector storage comprises a plurality of bits, one bit for each possible version identifier supported by an architecture of the data processing system, such that a total number of bits in the plurality of bits is a maximum number of version identifiers supported by the architecture.

13. The computer program product of claim 11, wherein the computer readable program causes the computing device to schedule tasks performed by the multi-threaded computer program based on the thread dependency vector by:
generating a speculative task dependence graph (STDG); and
updating the STDG dynamically using the hardware thread dependency vector storage.

14. The computer program product of claim 11, wherein the computer readable program further causes the computing device to:
performing, by the first thread, one of a read operation or a write operation on a version of a cache line of a speculative versioning cache in the data processing system, and wherein the computer readable program causes the computing device to detect a dependency of the first thread's execution on results of a second thread's execution in an execution flow of the multi-threaded computer program by:
determining if the first thread has written to the version of the cache line, and
in response to the first thread having written to the version of the cache line, performing the following operations:
determining whether an unprocessed younger thread read this version of the cache line written to by the first thread;

in response to an unprocessed younger thread having read this version of the cache line, retrieving a thread identifier (TID) and version identifier (VID) of the unprocessed younger thread that read this version of the cache line;

retrieving a thread dependency vector (D) associated with the combination of the TID and VID of the unprocessed younger thread; and clearing the thread dependency vector and setting a bit in the thread dependency vector (D) corresponding to a thread identifier and a version identifier of the first thread.

15. The computer program product of claim 14, wherein, in response to the first thread having read the version of the cache line, the computer readable program causes the computing device to perform the following operations:

determine whether an unprocessed older thread wrote to this version of the cache line written to by the first thread;

in response to an unprocessed older thread having written to this version of the cache line, retrieve a TID and VID of the unprocessed older thread that wrote to this version of the cache line;

retrieve a thread dependency vector associated with the first thread; and set a bit, corresponding to the TID and VID of the unprocessed older thread, in the thread dependency vector of the first thread.

16. A computer program product comprising a non-transitory computer recordable medium having a computer readable program recorded thereon, wherein the computer readable program, when executed on a computing device, causes the computing device to:

detect a dependency of a first thread's execution on results of a second thread's execution in an execution flow of a multi-threaded computer program;

store, in a hardware thread dependency vector storage associated with the first thread's execution, an identifier of the dependency by setting at least one bit in the hardware thread dependency vector storage corresponding to the second thread;

schedule tasks performed by the multi-threaded computer program based on a state of bits in the hardware thread dependency vector storage; and obtain a version identifier (VID) of a cache line in a speculative versioning cache accessed by the second thread, in response to detecting the dependency, wherein the at least one bit in the hardware thread dependency vector storage is at least one bit corresponding to the VID of the cache line accessed by the second thread.

17. A computer program product comprising a non-transitory computer recordable medium having a computer readable program recorded thereon, wherein the computer readable program, when executed on a computing device, causes the computing device to:

detect a dependency of a first thread's execution on results of a second thread's execution in an execution flow of a multi-threaded computer program;

store, in a hardware thread dependency vector storage associated with the first thread's execution, an identifier of the dependency by setting at least one bit in the hardware thread dependency vector storage corresponding to the second thread; and schedule tasks performed by the multi-threaded computer program based on a state of bits in the hardware thread dependency vector storage, wherein the computer readable program causes the computing device to detect a dependency of the first thread's execution on results of a second thread's execution in an execution flow of the multi-threaded computer program by:

tracking, in each cache line of a speculative cache, a first version identifier associated with a last thread to have read the cache line and a second version identifier associated with a last thread to have written to the cache line, and determining dependencies based on the first and second version identifiers.

18. The computer program product of claim 17, wherein the first version identifier and second version identifier are maintained even after corresponding threads have changed state from a speculative state of execution to a non-speculative state of execution.

19. An apparatus, comprising:

dependency detection logic; and thread dependency vector storage hardware coupled to the dependency detection logic, wherein the dependency detection logic:

detects a dependency of a first thread's execution on results of a second thread's execution in an execution flow of a multi-threaded computer program;

stores, in a portion of the thread dependency vector storage hardware associated with the first thread's execution, an identifier of the dependency by setting at least one bit in the portion of the thread dependency vector storage hardware corresponding to the second thread; and a task scheduler running on the apparatus schedules tasks performed by the multi-threaded computer program based on a state of bits in the thread dependency vector storage hardware, wherein the first thread is a speculative thread having an associated version identifier for use with a speculative versioning cache, and wherein the at least one bit in the hardware thread dependency vector storage corresponding to the second thread corresponds to the version identifier associated with the second thread.

* * * * *